(12) United States Patent
Quebral et al.

(10) Patent No.: US 6,289,817 B1
(45) Date of Patent: Sep. 18, 2001

(54) REMOTE CONTROLLED PAYLOAD DELIVERY

(75) Inventors: Anthony P. Quebral, Greenbelt, MD (US); Phillip R. Sturgill, Alexandria; Mindy W. Morack, Herndon, both of VA (US); David A. Culhane, Columbia; Chris Batchelor, White Plains, both of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/386,221

(22) Filed: Aug. 31, 1999

Related U.S. Application Data
(60) Provisional application No. 60/107,914, filed on Nov. 10, 1998.

(51) Int. Cl.[7] .................. F42B 4/00; F41F 5/00; B64D 1/12
(52) U.S. Cl. .............. 102/357; 89/1.55; 89/1.56; 244/137.4
(58) Field of Search ............. 102/357; 89/1.55, 89/1.56; 244/136, 137.4

(56) References Cited

U.S. PATENT DOCUMENTS

| 3,021,758 | * | 2/1962 | Sholtz ..................... 89/1.56 |
| 3,243,084 | | 3/1966 | Stegner . |
| 3,779,129 | * | 12/1973 | Lauro ..................... 89/1.56 |
| 4,164,887 | * | 8/1979 | Ouellette ............... 102/357 X |
| 4,621,579 | * | 11/1986 | Badura et al. .......... 102/357 X |
| 4,825,151 | * | 4/1989 | Aspelin ................. 89/1.56 X |
| 5,016,789 | | 5/1991 | Singh . |
| 5,154,314 | | 10/1992 | Van Wormer . |
| 5,229,538 | * | 7/1993 | McGlynn et al. ........ 89/1.56 X |
| 5,602,362 | * | 2/1997 | Billard et al. ............ 102/357 |
| 5,614,896 | * | 3/1997 | Monk et al. ............ 89/1.56 X |
| 5,623,113 | * | 4/1997 | Valembois ............. 244/137.4 X |

* cited by examiner

Primary Examiner—Peter A. Nelson
(74) Attorney, Agent, or Firm—Mark Homer

(57) ABSTRACT

A radio frequency receiver, in response to input command signals from some remote source, initiates electrical powering of an electronic firing circuit through which electric pulses are generated and fed through a power cable to impulse cartridges at the upper ends of storage tubes within a payload dispenser. The impulse cartridges in response to such pulses ignites the payloads stored therebelow within the storage tubes closed by retention caps that are ejected with the payload from the dispenser during ignition.

8 Claims, 5 Drawing Sheets

REMOTE CONTROLLED PAYLOAD DELIVERY

The present invention relates in general to remote controlled dispensing as disclosed in copending provisional application Ser. No. 60/107,914 filed Nov. 10, 1998, with respect to which the present application is a continuation.

BACKGROUND OF THE INVENTION

Remote controlled systems for dispensing of items from a storage enclosure is already generally known in the art. Various problems are associated with such systems, which are avoided by the present invention.

SUMMARY OF THE INVENTION

In accordance with the present invention, a computer signal is generated to power an electronic firing circuit once a target has been identified. Such firing signal is received through a radio frequency link to generate an electrical pulse transferred by a cable to impulse cartridges associated with payload storing assemblies in a dispenser for explosive ignition to eject the payloads from the bottom of tubes, otherwise closed by retention end caps, in response to expanding ballistic gases. The payloads are thereby propelled at a velocity sufficient to clear adjacent structure such as wings or landing gear on aircraft carrying the payload dispenser.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

Figure 1:
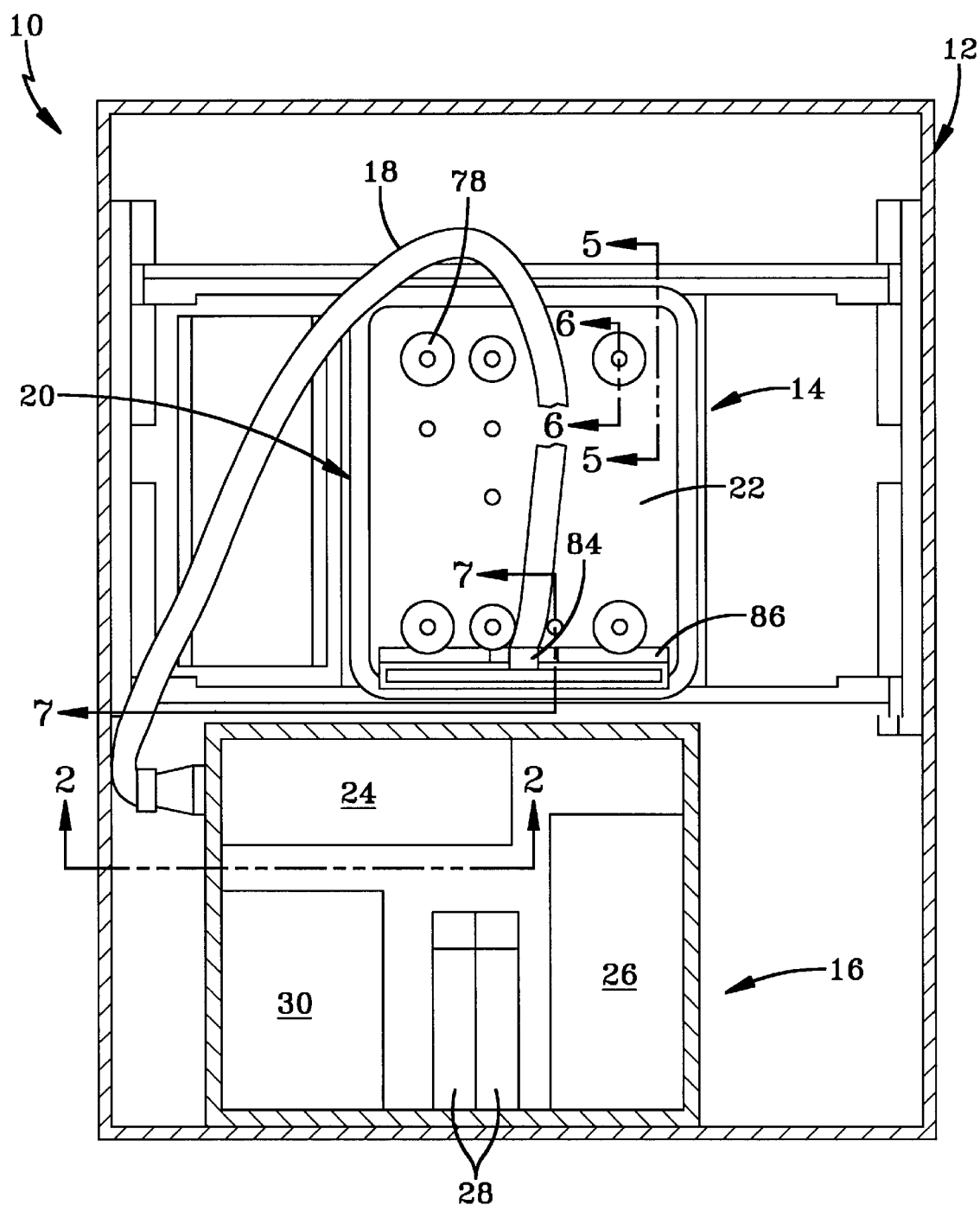
FIG. 1 is a top plan view of a remote-controlled payload dispenser assembly in accordance with one embodiment of the invention.
Figure 3:
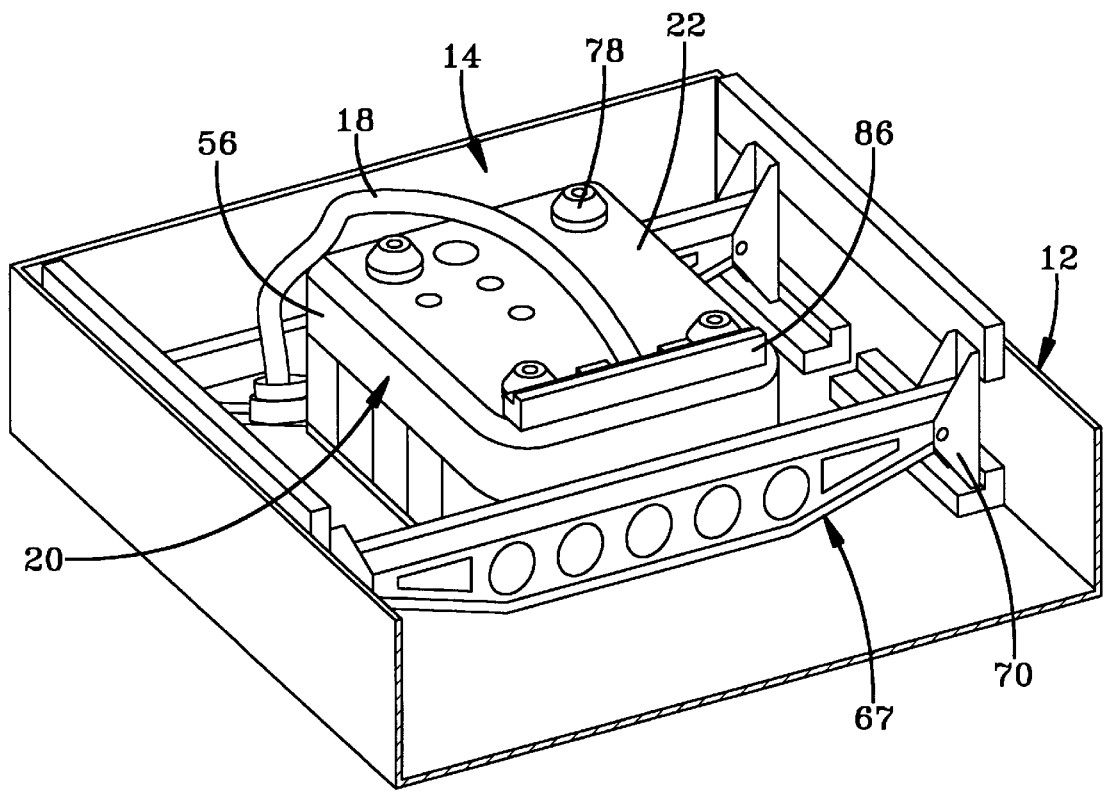
FIG. 3 is a perspective view of a portion of the dispenser assembly shown in FIG. 1.
Figure 5:
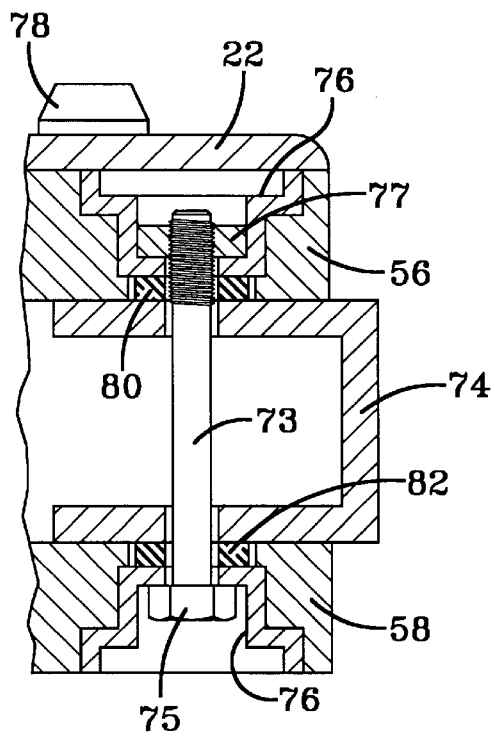
Figure 6:
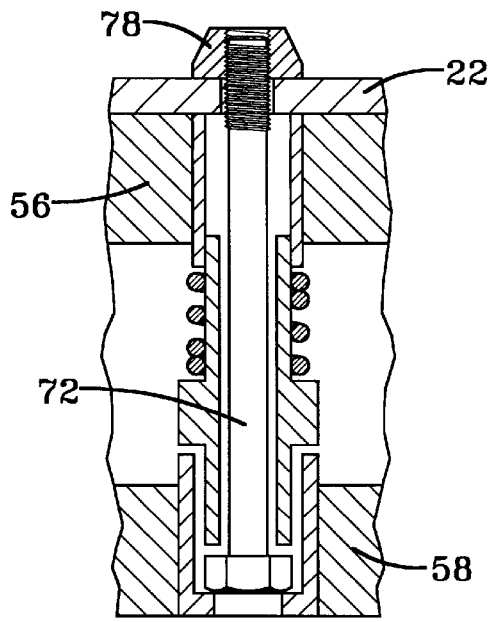
Figure 7:
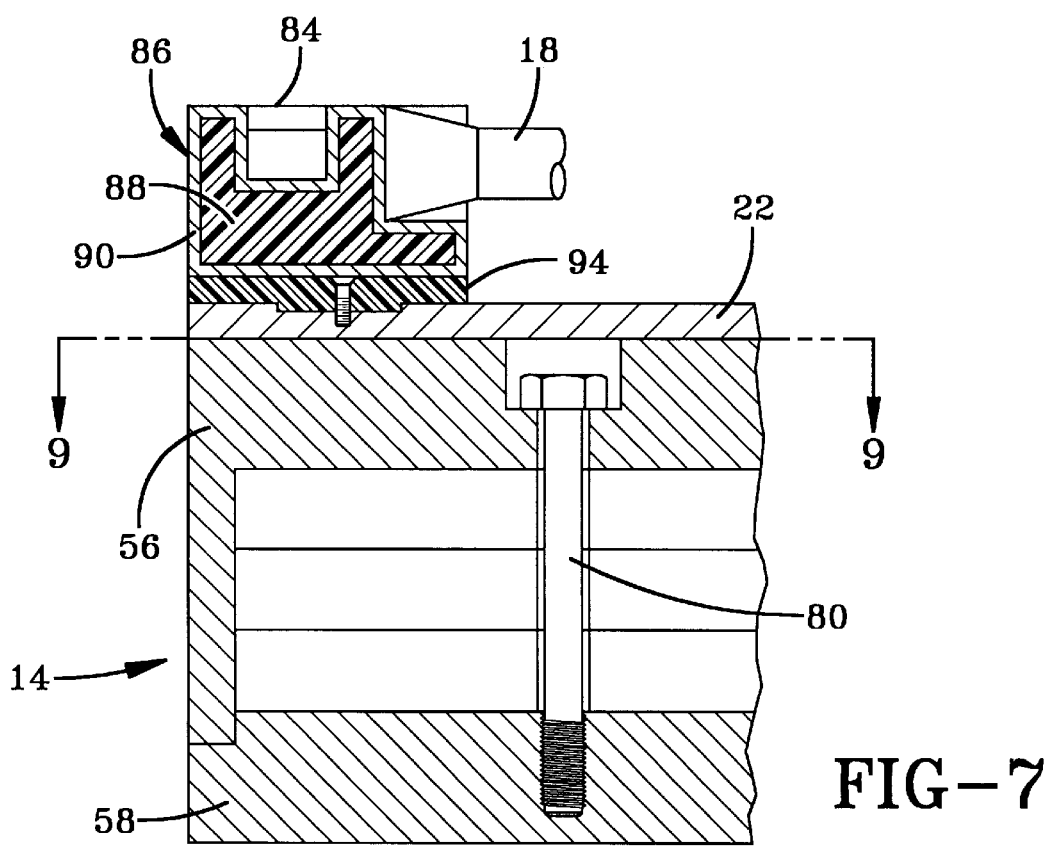
Figure 8:
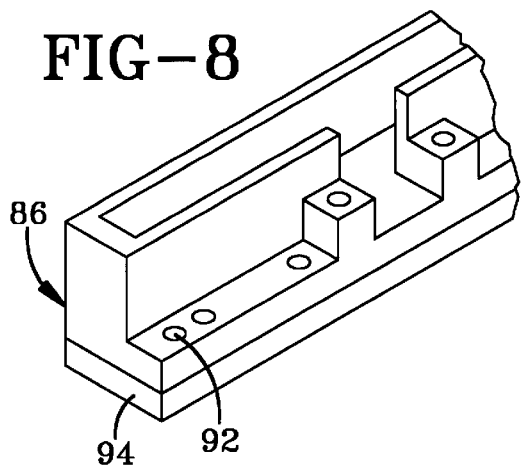
Figure 9:
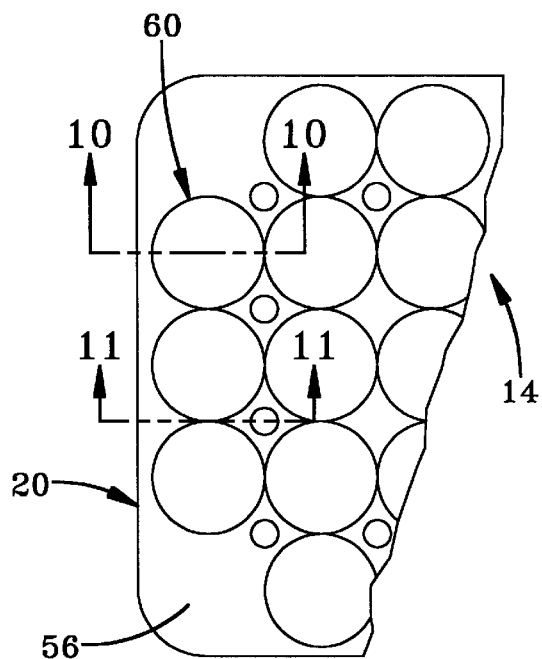
Figure 10:
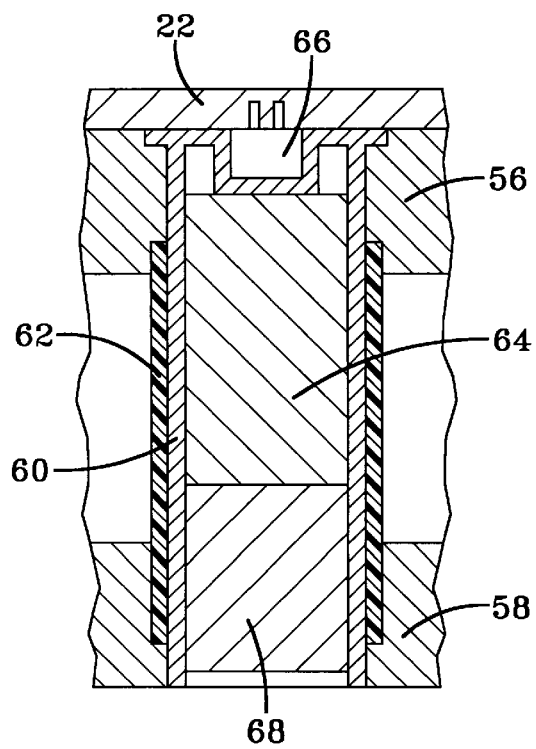
Figure 11:
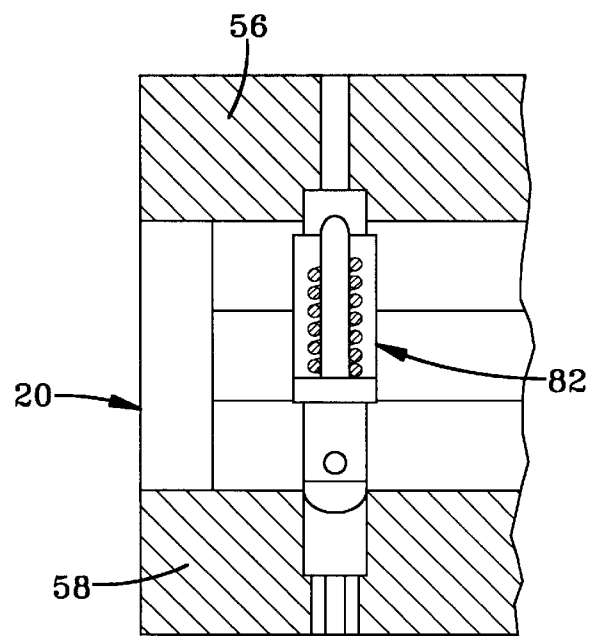

FIGS. 5, 6 and 7 are partial section views taken substantially through planes indicated by section lines 5—5, 6—6 and 7—7 in FIG. 1;

FIG. 8 is a partial perspective of certain disassembled parts of the dispenser assembly shown in FIGS. 1 and 3;

FIG. 9 is a partial section view taken substantially through a plane indicated by section line 9—9 in FIG. 7; and FIGS. 10 and 11 are partial section views taken substantially through planes indicated by section lines 10—10 and 11—11 in FIG. 9.

DETAILED DESCRIPTION OF PREFERRED EMBODIMENT

Referring now to the drawing in detail, FIG. 1 is a top plan view of a remote-controlled payload delivery system, generally referred to by reference numeral 10. Such system, which is shown fixedly mounted within a rectangular enclosure 12, has two basic components consisting of a payload dispenser assembly 14 and an electronic firing circuit 16 through which remote control is exercised for precise payload delivery. The firing circuit 16 is accordingly connected by a signal controlled electrical power cable 18 to the payload dispenser assembly 14.

As shown in FIGS. 1 and 3, the payload dispenser assembly 14 includes a dispenser block or magazine 20 within which a plurality of payloads are disposed as hereinafter described, underlying a top breech plate 22 to which one end of the cable 18 is connected. The other end of the cable 18 is connected to a commercially available type of programmable logic controller 24 to allow an operator to control payload delivery when enabled through a radio assembly 26 of the circuit 16, which also has associated therewith two batteries 28 and a payload delivery data processor 30.

Figure 4:
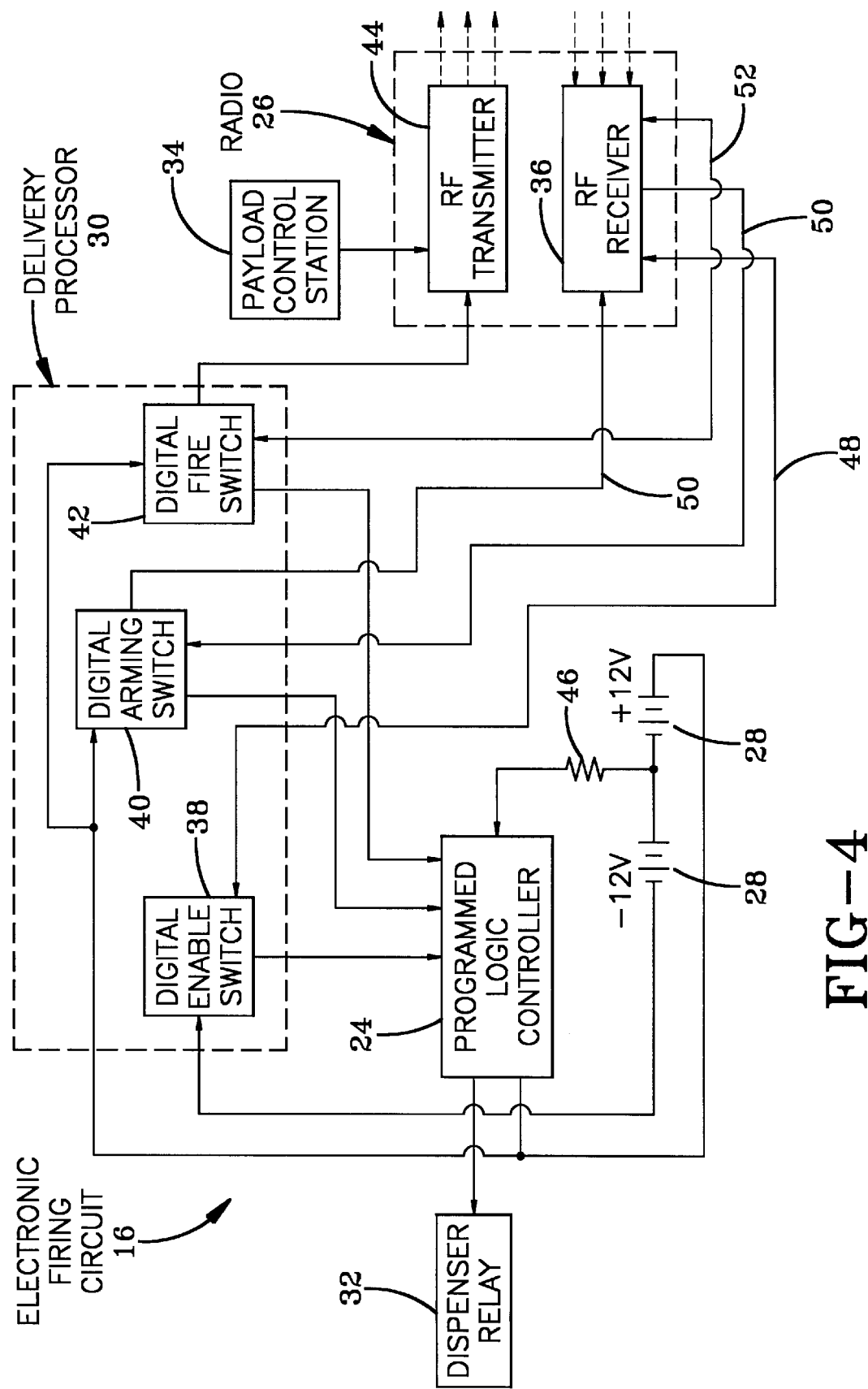
FIG. 4 is a block diagram corresponding to the control circuitry associated with the dispenser assembly illustrated in FIGS. 1–3.

FIG. 4 diagrams the circuitry associated with the foregoing referred to components of the electric firing circuit 16 which are operative through a dispenser relay 32, when the controller 24 is loaded with a control program, to control the sequence and interval of payload delivery from the dispenser assembly 14. In order to dispense the payload, the operator must exercise a series of steps through a payload control station 34 coupled to the radio assembly 26 in order to activate the controller 24 through the delivery processor 30. The controller 24 is essentially a computer with built-in discrete inputs and outputs to the dispenser relay 32. Thus, relay ladder logic is used as programming language to develop control programs using a laptop computer. Using such a control program, the controller 24 executes logic commands and actuates a series of relay outputs based on the electronic signals detected at its input terminals interfaced by the delivery processor 30 with a RF receiver 36 of the radio assembly 26. Such interfacing by the delivery processor 30 as diagrammed in FIG. 4 is performed by digital switches, consisting of an enable switch 38, an arming switch 40 and a fire switch 42. The radio assembly 26 also includes an RF transmitter 44 connected to the fire switch 42 to establish with the receiver 36 a control link between the payload control station 34 and the payload dispenser assembly 14 to which the dispenser relay 32 is connected.

As shown in FIG. 4, the two batteries 28, which are rechargeable 12-volt 1.2 amp/hour lead acid type batteries, are interconnected in series with each other and connected through a current limiting resistor 46 to the controller 24 in order to provide it with the necessary 24-volt input. The two batteries 28 have their other 12-volt terminals of opposite polarity respectively connected to the controller 24 and the digital switches 38, 40 and 42 so as to provide the payload firing current limited by the resistor 46 to 6 amperes.

The three digital switches 38, 40 and 42 when arranged in the circuit 16 programmed through controller 24, requires that the operator execute a series of steps in order to dispense tie payload. First, the enable switch 38 is actuated to apply an enable signal to the controller. Once such "enable" signal is received through conductor 48, the receiver 36 actuates the enable switch 38 to apply a return signal to the controller 24 which completes a 24 volt power supply circuit in order to execute the control program therein and enable firing current supply. The operator then actuates the arming switch 40 so as to transmit an "arm" signal for supply of a 24 volt input to the controller 24 causing it to execute a specific set of logic commands so as to "arm" the system which remains "armed" as long as controller 24 detects the "arm" signal from receiver 36 through conductor 50. Finally, a fire signal initiated by the operator is transmitted from and returned to the fire switch 42 through conductor 52 to apply a 24-volt "fire" input to the controller 24 causing it to execute the programmed firing sequence and supply of the firing outputs to the dispenser relay 32, followed by programmed reset of the controller. The foregoing referred to control program loaded into the controller 24 also embodies various safety features. Such safety features consist of: a) all relay outputs are off during application of the 24-volt power to the controller; b) the system will be armed only if the "arm" signal is detected before a fire input signal so as to remain in a safe non-firing condition; c) the system returns to such safe condition when the "arm" input from switch 40 is turned off; d) the fire input from switch 42 has an adjustable time delay to ensure that the "fire" signal input is detected for a specific length of time; and e) after completion of the entire programmed firing sequence, the system is reset to the safe condition.

Figure 2:
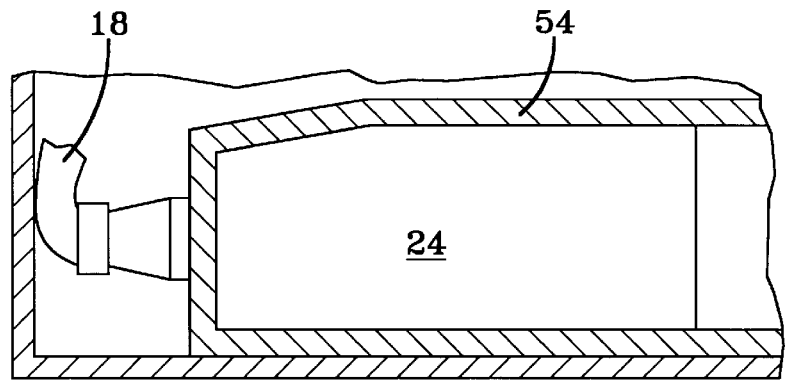
FIG. 2 is a partial section view taken substantially through a plane indicated by section line 2—2 in FIG. 1.

The electronic firing circuit 16 as hereinbefore described is enclosed in fixedly mounted relation to the outer enclosure 12, below a removable cover 54 as shown in FIG. 2. When a firing action is effected through switch 42, an input is also transmitted to the transmitter 44 to signal completion of the firing sequence to the remote location from which operator switch control signals received by the receiver 36 originate.

In regard to the payload dispenser assembly 14 shown in FIGS. 1 and 3, the dispenser block 20 has top and bottom plate portions 56 and 58 between which a plurality of payload tube assemblies 60 are disposed in interfaced relation to the assembly 14 as shown in FIGS. 9 and 10. Each payload tube assembly 60 has an outer plastic tube 62 within which a payload 64 is safely stored. The payload 64 may be in the form of canisters, smoke grenades, sensors, marking rounds, plastic shapes or any body of material which can withstand pyrotechnic shock. At the upper axial end of the payload tube assembly 60 within the top plate portion 56 of the dispenser block assembly 20, a cavity is formed within the plastic tube 62 for receiving one of a plurality of impulse cartridges 66 projecting from the underside of the breech plate 22 attached to the top plate portion 56 of the dispenser block 20. Such cartridges 66 transfer electrical pulses from the breech plate 22 for explosive ignition and ejection of the payload 64 with its lower retention end cap 68 through openings in the bottom plate portion 58 as shown in FIG. 10.

The dispenser block 20 is supported within the outer enclosure 12, as more clearly seen in FIG. 3, by a pair of crossmembers 68 having mounting brackets 70 at opposite ends thereof for physical attachment to the enclosure 12. Such mounting of the dispenser block 20 provides structural integrity to withstand the pyrotechnic shock or recoil forces distributed during payload ejection.

The breech block 22 adjustably attached to the top plate portion 56 of the dispenser block 20 at each of its four corners by a threaded bolt 73 as shown in FIG. 5, also holds the plate portions 56 and 58 attached to the crossmembers 67 through tabs 74 projecting therefrom intermediate the ends at which the enclosure attachment brackets 70 are located. Collar mount assemblies 76 as shown in FIG. 5 are disposed within the top and bottom plates 56 and 58 in alignment with each other for receiving the bolt 73 therethrough having its head 75 within the lower one of the collar mounts 76. The upper threaded end portion of the bolt 73 extends through the upper one of the collar mounts and terminates in the recess of the upper collar held in place by a nut 77. The breech plate 22 is secured to the breech block 20 via four bolts 72, as shown in FIG. 6, by threaded attachment to a threaded cone 78. Other adjustable and shock-absorbing spacing connectors 80 and 82 between the top and bottom plates 56 and 58 of the dispenser block 20 are provided as respectively shown in FIGS. 7 and 11.

FIGS. 7 and 8 illustrate the electrical interfacing between the cable 18 and the breech plate 22 through which the electrical pulses are transmitted to each payload assembly 60 as aforementioned. The cable 18 is attached at one end by an aluminum clamp 84 to a plastic connector 86 secured to one side of the breech plate 22. The connector 86 has a plastic body 88 covered by an outer shielding copper foil 90, and is secured by metal fasteners extending through holes 92 adjacent its ends as shown in FIG. 8, to the breech plate 22 in overlying relation to a plastic pin restraint plate 94 as shown in FIG. 7.

Obviously, other modifications and variations of the present invention may be possible in light of the foregoing teachings. It is therefore to be understood that within the scope of the invention may be practiced otherwise than as specifically described.

What is claimed is:

1. A system for delivery of payloads, comprising: a remote source of radio frequency input signals; radio frequency linkage means for receiving said radio frequency input signals; target programmed circuit means powered by the radio frequency input signals received by the linkage means for generating firing pulses; dispensing means for storing said payloads, ignition means responsive to said firing pulses for igniting the payloads within the dispensing means; and means transferring the firing pulses from the circuit means to the ignition means to effect said igniting of the payloads for ejection thereof from the dispensing means.

2. The system as defined in claim 1, wherein said means transferring the firing pulses is an electric power cable.

3. The system as defined in claim 1, wherein said dispensing means includes a plurality of storage tubes within which the payloads are stored, having opposite axial ends; displaceable retention caps respectively closing one of the opposite axial ends of the storage tubes while in abutment with the payloads therein; the other axial ends of the storage tubes enclosing the ignition means therein.

4. The system as defined in claim 3, wherein said ignition means comprises a plurality of impulse cartridges respectively enclosed within the storage tubes at the other axial ends thereof during electrical connection to the electric power cable.

5. The combination as defined in claim 1, wherein said dispensing means includes a plurality of storage tubes within which the payloads are stored, having opposite axial ends; displaceable retention caps respectively closing one of the opposite axial ends of the storage tubes while in abutment with the payloads therein; the other axial ends of the storage tubes enclosing the ignition means therein.

6. The system as defined in claim 1, wherein said ignition means comprises a plurality of impulse cartridges.

7. The system as defined in claim 1, wherein the remote source of radio frequency input signals comprises a wireless radio frequency communication system.

8. A system for delivery of payloads, comprising: a remote source of radio frequency input signals; radio frequency linkage means for receiving said radio frequency input signals; target programmed circuit means powered by the radio frequency input signals received by the linkage means for generating firing pulses; a plurality of storage tubes within which the payloads are stored, having opposite axial ends; displaceable retention caps respectively closing one of the opposite axial ends of the storage tubes while in abutment with the payloads therein; a second axial end of the storage tubes; a plurality of impulse cartridges for igniting the payloads respectively enclosed within the storage tubes at the second axial end thereof during electrical connection to the electric power cable; and, means transferring the firing pulses from the circuit means to the plurality of impulse cartridges to effect said igniting of the payloads for ejection thereof from the storage tubes.

* * * * *